US012430957B2

(12) United States Patent
Kodama et al.

(10) Patent No.: US 12,430,957 B2
(45) Date of Patent: Sep. 30, 2025

(54) ON-VEHICLE RECORDING CONTROL APPARATUS AND RECORDING CONTROL METHOD

(71) Applicant: JVCKENWOOD Corporation, Yokohama (JP)

(72) Inventors: Kentaro Kodama, Yokohama (JP); Masakiyo Sakano, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/638,738

(22) Filed: Apr. 18, 2024

(65) Prior Publication Data

US 2024/0265749 A1 Aug. 8, 2024

Related U.S. Application Data

(63) Continuation of application No. PCT/JP2022/034728, filed on Sep. 16, 2022.

(30) Foreign Application Priority Data

Oct. 22, 2021 (JP) ................................ 2021-172905
Jul. 27, 2022 (JP) ................................ 2022-119605

(51) Int. Cl.
*G07C 5/08* (2006.01)
*G07C 5/00* (2006.01)
(Continued)

(52) U.S. Cl.
CPC ............... *G07C 5/08* (2013.01); *G11B 27/10* (2013.01); *H04N 5/77* (2013.01); *H04N 5/92* (2013.01); *H04N 7/188* (2013.01)

(58) Field of Classification Search
None
See application file for complete search history.

(56) References Cited

U.S. PATENT DOCUMENTS

2016/0155004 A1* 6/2016 Shiraishi ................ B60K 35/00
                                                        348/77
2022/0076505 A1    3/2022 Hayashi et al.
2022/0345661 A1* 10/2022 Kawasaki ................ H04N 5/91

FOREIGN PATENT DOCUMENTS

JP       10-029567       2/1998
JP     2018-191207     11/2018
(Continued)

OTHER PUBLICATIONS

International Search Report and Written Opinion for International Application Serial No. PCT/JP2022/034728 mailed on Oct. 25, 2022, 10 pages.

*Primary Examiner* — Hung Q Dang
(74) *Attorney, Agent, or Firm* — Amin, Turocy & Watson, LLP

(57) ABSTRACT

An on-vehicle recording control apparatus includes: a captured data acquisition unit configured to acquire video data of surroundings of a vehicle captured by a camera; an event detection unit configured to detect an event based on acceleration applied to the vehicle; an operation controller configured to receive event recording operation based on user operation; and a recording controller configured to: record the acquired video data; generate and store, from the acquired video data, event data of a longer retroactive period when the operation controller receives the event recording operation and acceleration that is equal to or larger than a predetermined value and not determined as an event is detected before receiving the event recording operation, as compared to a case in which the acceleration that is equal to or larger than the predetermined value and not determined as an event is not detected before receiving the event recording operation.

5 Claims, 15 Drawing Sheets

(51) Int. Cl.
*G11B 27/10* (2006.01)
*H04N 5/77* (2006.01)
*H04N 5/92* (2006.01)
*H04N 7/18* (2006.01)

(56) References Cited

FOREIGN PATENT DOCUMENTS

| | | |
|---|---|---|
| JP | 2019-061624 | 4/2019 |
| WO | 2020/261721 | 12/2020 |

\* cited by examiner

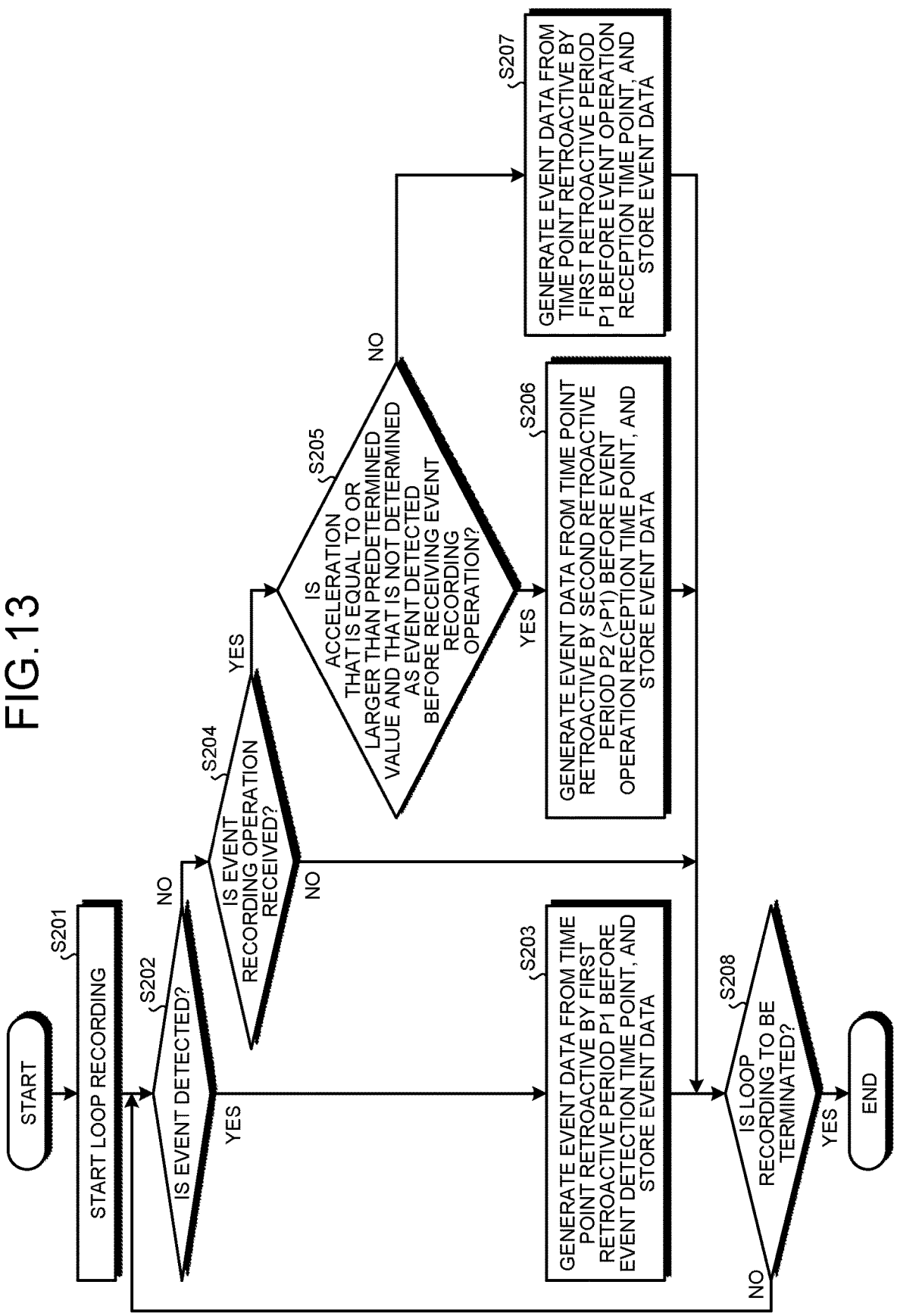

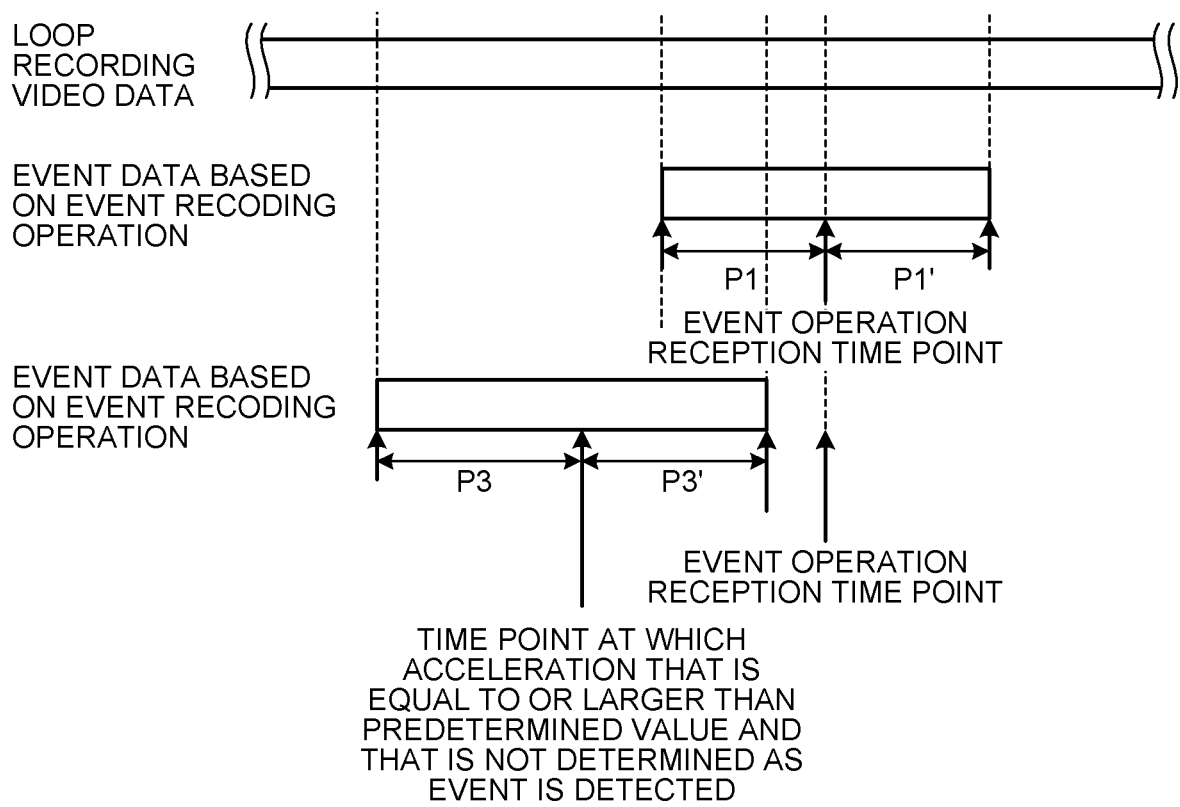

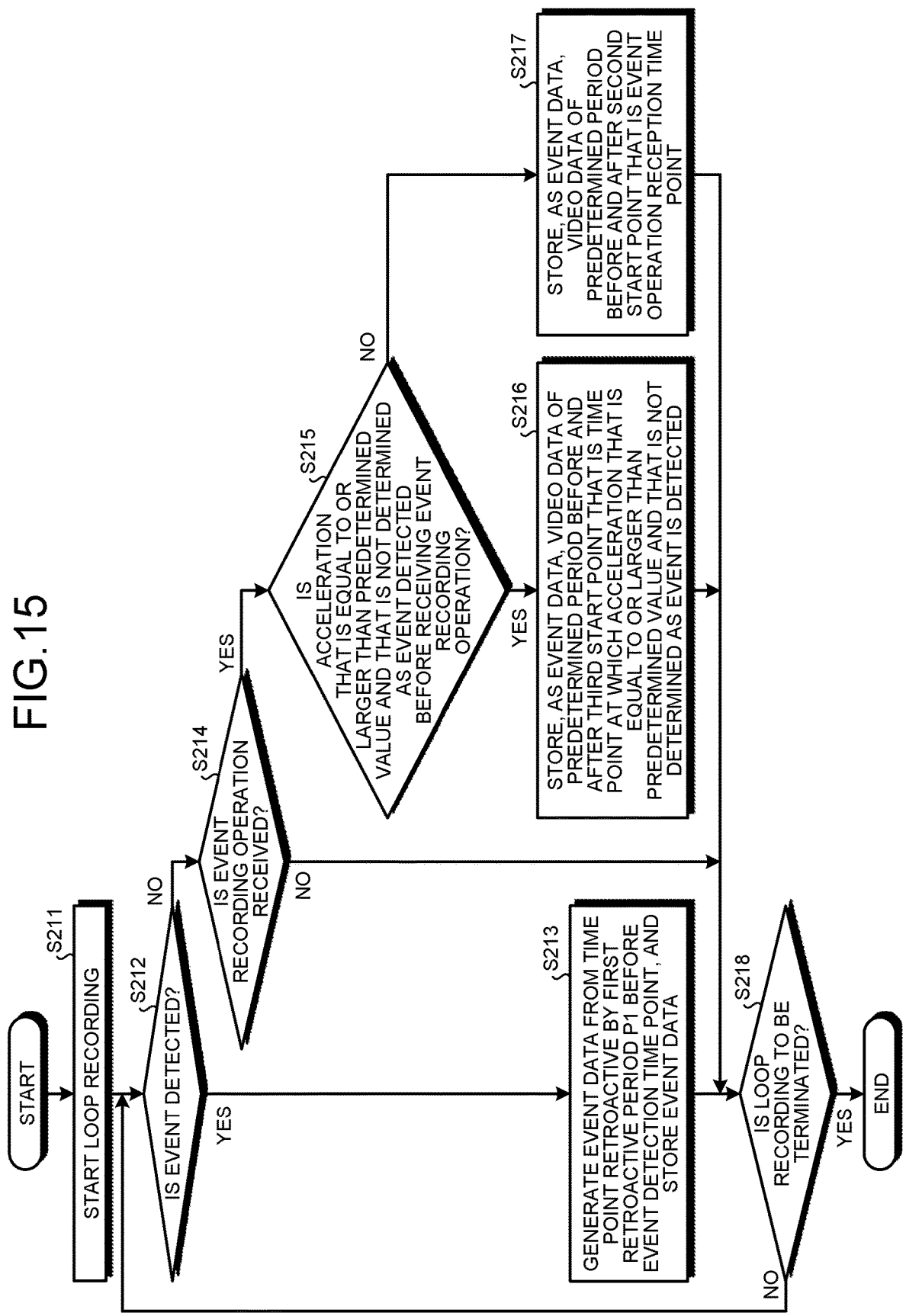

ON-VEHICLE RECORDING CONTROL APPARATUS AND RECORDING CONTROL METHOD

CROSS-REFERENCE TO RELATED APPLICATIONS

This application is a Continuation of PCT International Application No. PCT/JP2022/034728 filed on Sep. 16, 2022 which claims the benefit of priority from Japanese Patent Application No. 2021-172905 filed on Oct. 22, 2021 and Japanese Patent Applications No. 2022-119563 and No. 2022-119605, both filed on Jul. 27, 2022, the entire contents of all of which are incorporated herein by reference.

FIELD OF THE INVENTION

The present application relates to an on-vehicle recording control apparatus and a recording control method.

BACKGROUND OF THE INVENTION

A drive recorder of a vehicle records an event when a collision is detected based on acceleration and when user operation is performed. Further, a technology for changing an event recording time has been proposed (for example, see Japanese Laid-open Patent Publication No. 2018-191207). In the technology described in Japanese Laid-open Patent Publication No. 2018-191207, an event recording time before detection of an event is increased based on a traveling speed of a vehicle.

Event data is, for example, video data of a certain period, such as 10 seconds, before and after an event detection time point or an operation reception time point. In event recording based on acceleration, occurrence of an event is directly detected. However, in event recording based on user operation, a time lag occurs from a user recognition of an event that the user wants to store as event data to a user operation. Therefore, in recorded event data, in some cases, an event or the likes is not appropriately recorded. The event recording based on user operation is performed when an accident due to another vehicle and not due to an own vehicle is to be recorded, when an event other than an accident is to be recorded based on an interest of the user, and when the event recording based on acceleration has not been recorded at an event which may be occurred due to the own vehicle and at which a magnitude of acceleration applied to the own vehicle is not acceleration determined as an event.

SUMMARY OF THE INVENTION

An on-vehicle recording control apparatus and a recording control method are disclosed.

According to one aspect of the present application, there is provided an on-vehicle recording control apparatus comprising: a captured data acquisition unit configured to acquire video data captured by a camera that captures an image of surroundings of a vehicle; an event detection unit configured to detect an event based on acceleration applied to the vehicle; an operation controller configured to receive event recording operation based on user operation; and a recording controller configured to: record the video data acquired by the captured data acquisition unit; generate, from the video data, event data of a longer retroactive period when the operation controller receives the event recording operation and acceleration that is equal to or larger than a predetermined value and that is not determined as an event by the event detection unit is detected before receiving the event recording operation, as compared to a case in which the acceleration that is equal to or larger than the predetermined value and that is not determined as an event by the event detection unit is not detected before receiving the event recording operation; and store the generated event data.

According to one aspect of the present application, there is provided a recording control method implemented by an on-vehicle recording control apparatus comprising: acquiring video data captured by a camera that captures an image of surroundings of a vehicle; detecting an event based on acceleration applied to the vehicle; receiving event recording operation based on user operation; recording the video data acquired at the acquiring; generating, from the video data, event data of a longer retroactive period when the event recording operation is received at the receiving and acceleration that is equal to or larger than a predetermined value and that is not determined as an event is detected at the detecting before receiving the event recording operation, as compared to a case in which the acceleration that is equal to or larger than the predetermined value and that is not determined as an event at the detecting is not detected before receiving the event recording operation; and storing the generated event data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a flowchart illustrating an example of a flow of processes performed by a control apparatus according to a sixth embodiment;

FIG. 14 is a diagram illustrating still another example of the event data recording period; and FIG. 15 is a flowchart illustrating an example of a flow of processes performed by a control apparatus according to a seventh embodiment.

DETAILED DESCRIPTION OF THE INVENTION

Embodiments of an on-vehicle recording control apparatus and a recording control method according to the present application will be described in detail below with reference to the accompanying drawings. The present application is not limited by the embodiments below.

First Embodiment

On-Vehicle Recording Apparatus

Figure 1:
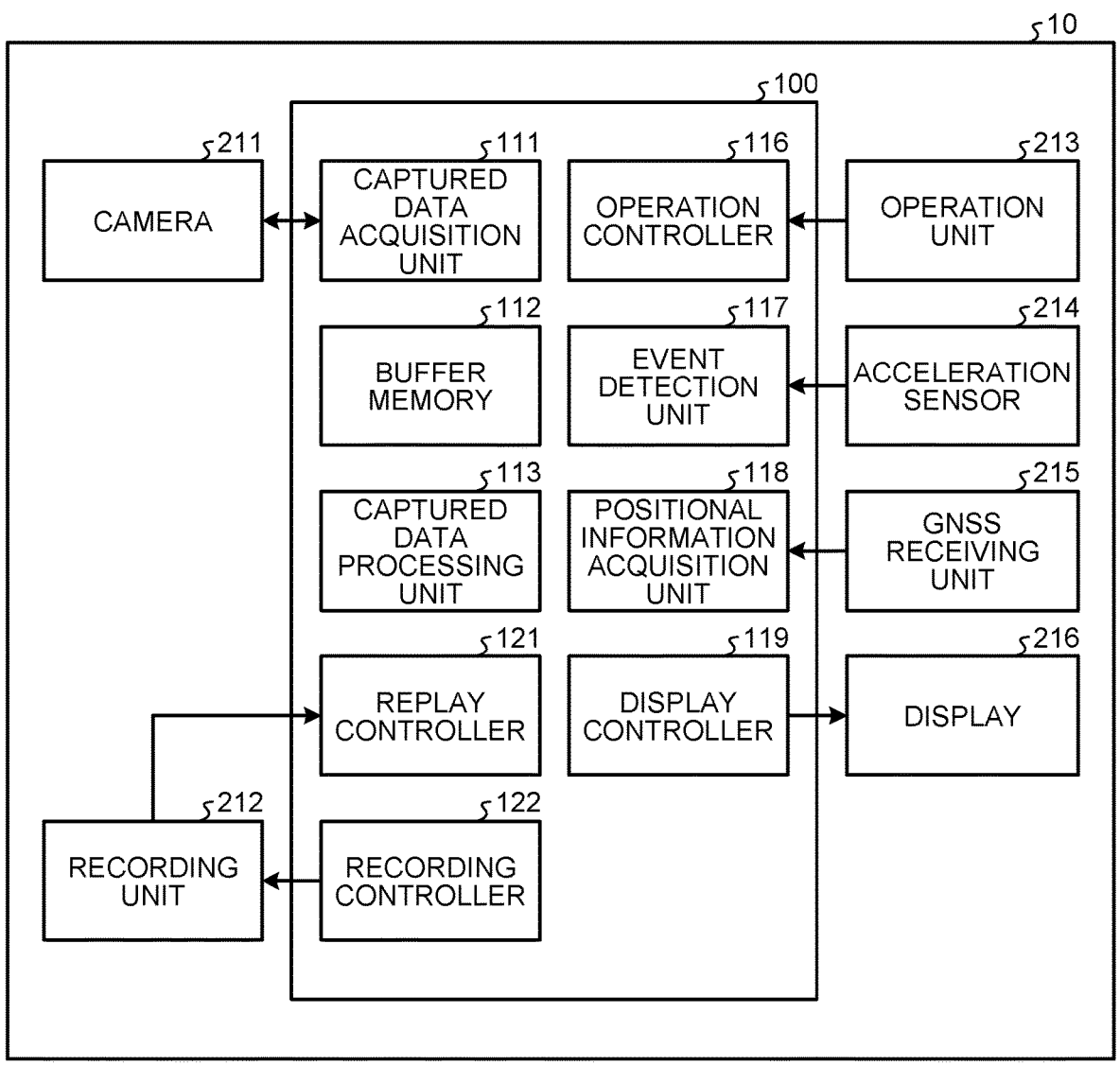
FIG. 1 is a block diagram illustrating a configuration example of an on-vehicle recording control apparatus including a control apparatus according to a first embodiment.

FIG. 1 is a block diagram illustrating a configuration example of an on-vehicle recording apparatus 10 including an on-vehicle recording control apparatus (hereinafter, referred to as a "control apparatus") 100 according to a first embodiment. The on-vehicle recording apparatus 10 is what is called a drive recorder that records an event that has occurred with respect to a vehicle. The on-vehicle recording apparatus 10, when receiving event recording operation, stores event data of a longer retroactive period as compared to a case in which an event is detected.

The on-vehicle recording apparatus 10 may be an apparatus that is installed in a vehicle or may be a portable apparatus that is available in the vehicle. Furthermore, the on-vehicle recording apparatus 10 may include a function or a configuration of a device that is installed in advance in the vehicle, a navigation device, or the like. The on-vehicle recording apparatus 10 includes a camera 211, a recording unit 212, an operation unit 213, an acceleration sensor 214, a Global Navigation Satellite System (GNSS) receiving unit 215, a display 216, and the control apparatus 100.

The camera 211 is a camera that captures an image of surroundings of the vehicle. The camera 211 may be a group of multiple cameras. The camera 211 is arranged at a position on a front side inside the vehicle at which an image in front of the vehicle can be captured, for example. In the present embodiment, the camera 211 continuously captures videos while an accessory power supply of the vehicle is ON. The camera 211 outputs captured video data to a captured data acquisition unit 111 of the control apparatus 100. The video data is a moving image formed of images at 27.5 frames per second, for example.

The recording unit 212 is used to temporarily store data for the on-vehicle recording apparatus 10. The recording unit 212 is, for example, a semiconductor memory device, such as a random access memory (RAM) or a flash memory, or a recording unit, such as a memory card. Alternatively, the recording unit 212 may be an external recording unit that is wirelessly connected via a communication apparatus (not illustrated). The recording unit 212 records loop recording video data or event data based on a control signal that is output from a recording controller 122 of the control apparatus 100.

The operation unit 213 is able to receive various kinds of operation on the on-vehicle recording apparatus 10. The operation unit 213 is, for example, a touch panel that is arranged in an overlapping manner on a display screen of the display 216, for example. The operation unit 213 may be, for example, a microphone that collects voice commands spoken by a user. For example, the operation unit 213 is able to receive operation of manually storing the captured video data as event data in the recording unit 212. For example, the operation unit 213 is able to receive operation of replaying the loop recording video data or the event data that is recorded in the recording unit 212. For example, the operation unit 213 is able to receive operation of deleting the event data that is recorded in the recording unit 212. For example, the operation unit 213 is able to receive operation of terminating loop recording. The operation unit 213 outputs operation information to an operation controller 116 of the control apparatus 100.

The acceleration sensor 214 is a sensor that detects acceleration that occurs in the vehicle. The acceleration sensor 214 outputs a detection result to an event detection unit 117 of the control apparatus 100. The acceleration sensor 214 is, for example, a sensor for detecting acceleration in 3-axis directions. The 3-axis directions are a front-back direction, a left-right direction, and a vertical direction of the vehicle.

The GNSS receiving unit 215 includes a GNSS receiver for receiving a GNSS signal from a GNSS satellite, or the like. The GNSS receiving unit 215 outputs a received positional information signal to a positional information acquisition unit 118 of the control apparatus 100.

The display 216 is, as one example, a display device unique to the on-vehicle recording apparatus 10, a display device shared with a different system including a navigation system, or the like. The display 216 may be integrated with the camera 211. The display 216 is a display including, for example, a liquid crystal display (LCD), an organic electro-luminescence (EL) display, or the like. In the present embodiment, the display 216 is arranged on a dashboard, an instrument panel, a center console, or the like in front of a driver of the vehicle. The display 216 displays a video based on a video signal that is output from a display controller 119 of the control apparatus 100. The display 216 displays a video that is captured by the camera 211 or a video that is recorded in the recording unit 212.

On-Vehicle Recording Control Apparatus

The control apparatus 100 is, for example, an arithmetic processing device (control device) that is configured with a central processing unit (CPU) or the like. The control apparatus 100 loads a stored program onto a memory and executes a command included in the program. The control apparatus 100 includes an internal memory (not illustrated), and the internal memory is used to temporarily store data of the control apparatus 100. The control apparatus 100 includes the captured data acquisition unit 111, a buffer memory 112, a captured data processing unit 113, the operation controller 116, the event detection unit 117, the positional information acquisition unit 118, the display controller 119, a detection unit 120, a replay controller 121, and the recording controller 122.

The captured data acquisition unit 111 acquires video data of surroundings of the vehicle captured by the camera 211 that captures an image of the surrounding of the vehicle. The captured data acquisition unit 111 outputs the acquired video data to the buffer memory 112.

The buffer memory 112 is an internal memory included in the control apparatus 100, and is a memory for temporarily storing video data for a certain period of time that is acquired by the captured data acquisition unit 111, while updating the video data.

The captured data processing unit 113 converts the video data that is temporarily stored in the buffer memory 112 into an arbitrary file format, such as the MP4 format, which is encoded by an arbitrary method, such as H.264 or Moving Picture Experts Group (MPEG)-4, for example. The captured data processing unit 113 generates video data as a file for a certain period of time from the video data that are temporarily stored in the buffer memory 112. As a specific example, the captured data processing unit 113 generates, as a file, video data of 60 seconds in order of recording from among the video data that are temporarily stored in the buffer memory 112. The captured data processing unit 113 outputs the generated video data to the recording controller 122. Further, the captured data processing unit 113 decodes an image of the generated video data via the replay controller 121, and outputs the video data to the display controller 119. A duration of the video data that is generated as a file is assumed as 60 seconds as one example, but embodiments are not limited thereto. The video data described herein may be data including audio in addition to the images captured by the camera 211.

The operation controller 116 acquires operation information on operation that is received by the operation unit 213. For example, the operation controller 116 acquires storage operation information indicating operation of manually storing the video data, replay operation information indicating operation of replaying the video data, or deletion operation information indicating operation of deleting the video data, and outputs a control signal. For example, the operation controller 116 acquires termination operation information indicating operation of terminating loop recording, and outputs a control signal. For example, the operation controller 116 receives event recording operation by user operation. Examples of the event recording operation by user operation received by the operation controller 116 include event recording operation indicated by operation on a touch panel, and event recording operation indicated by input of a voice command.

The event detection unit 117 detects an event based on acceleration that is applied to the vehicle. More specifically, the event detection unit 117 detects an event based on a detection result of the acceleration sensor 214. The event detection unit 117 detects occurrence of an event when acceleration information acquired by the event detection unit 117 from the acceleration sensor 214 is equal to or larger than a threshold.

The positional information acquisition unit 118 acquires positional information indicating a present location of the vehicle. The positional information acquisition unit 118 calculates the positional information on the present location of the vehicle by a well-known method based on the GNSS signal that is received by the GNSS receiving unit 215.

The display controller 119 controls display of the video data on the display 216. The display controller 119 outputs a video signal that causes the display 216 to output video data. More specifically, the display controller 119 outputs a video that is captured by the camera 211, loop recording video data that is recorded in the recording unit 212, or a video data to be displayed by replay of the event data.

The replay controller 121 controls replay of the loop recording video data or the event data recorded in the recording unit 212 based on a control signal for replay operation that is output from the operation controller 116. The replay controller 121 includes a decoder (not illustrated), decodes supplied compressed data, and replays various kinds of data.

The recording controller 122 performs control of recording, in the recording unit 212, video data that is generated as a file by the captured data processing unit 113. During a period in which a loop recording process is performed, such as when an accessory power supply of the vehicle is ON, the recording controller 122 records, in the recording unit 212, video data that is generated as a file by the captured data processing unit 113 as rewritable video data. More specifically, the recording controller 122 continuously records the video data generated by the captured data processing unit 113 in the recording unit 212 while the loop recording process is being performed, and if the capacity of the recording unit 212 becomes full, the recording controller 122 records new video data by overwriting the oldest video data.

When the event detection unit 117 detects an event, the recording controller 122 stores video data corresponding to the detection of the event. The video data corresponding to the detection of the event is video data of a predetermined period among the video data that are generated by the captured data processing unit 113. The recording controller 122 stores the video data corresponding to the detection of the event in the recording unit 212 as event data for which overwrite is prohibited. When the event detection unit 117 detects an event, for example, the recording controller 122 copies video data of a predetermined period, such as about 10 seconds before and after a time point at which the event is detected, from the buffer memory 112, and stores the copied video data as event data. For example, the recording controller 122 generates event data from the video data of a period from a time point retroactive by a first retroactive period P1 before an event detection time point to a time point elapsed by a first elapsed period P1' after the event detection time point, and stores the event data.

When the operation controller 116 receives event recording operation, the recording controller 122 generates, from the video data, event data of a longer retroactive period as compared to a case in which the event detection unit 117 detects an event, and stores the event data. More specifically, the recording controller 122 generates event data such that a second retroactive period P2 (P1<P2) from an operation reception time point (hereinafter, referred to as an "event operation reception time point") when the operation controller 116 receives the event recording operation based on manual operation or a voice command given by a user is longer than the first retroactive period P1 from the event detection time point when the event detection unit 117 detects an event, and stores the event data. For example, the recording controller 122 generates event data from the video data of a period from a time point retroactive by the second retroactive period P2 before the event operation reception time point to a time point elapsed by the second elapsed period P2' (P1'=P2') after the event operation reception time point, and stores the event data.

Figure 2:
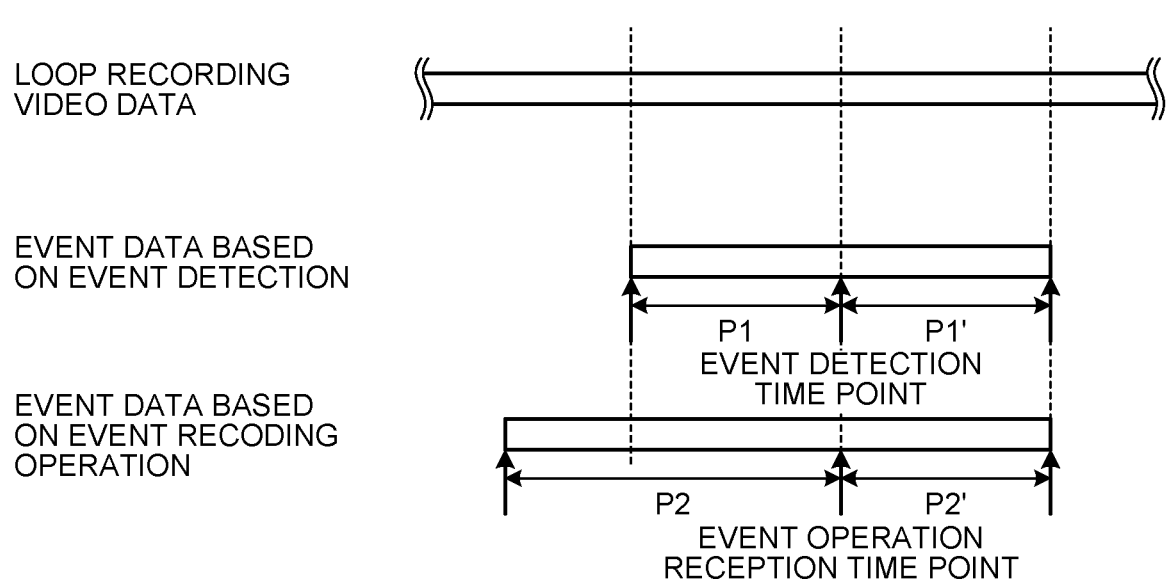
FIG. 2 is a diagram illustrating an example of a recording period of event data.

FIG. 2 is a diagram illustrating an example of an event data recording period. As for loop recording video data, video data that is generated by the captured data processing unit 113 is continuously recorded while the loop recording process is being performed. The period of the event data that is generated based on event detection is a period from a time point retroactive by the first retroactive period P1 before the event detection time point to a time point elapsed by the first elapsed period P1' after the event detection time point. The period of the event data that is generated based on the event recording operation is a period from a time point retroactive by the second retroactive period P2 before the event operation reception time point to a time point elapsed by the second elapsed period P2' after the event operation reception time point. The period of event data that is generated by the event recording operation is longer than the period of event data based on the event detection. For example, when the first retroactive period P1 is 10 seconds, the second retroactive period P2 is set to 15 seconds to 20 seconds. Further, the first elapsed period P1' and the second elapsed period P2' are set to 10 seconds, for example.

Information Processing Performed by On-Vehicle Recording Control Apparatus

Figure 3:
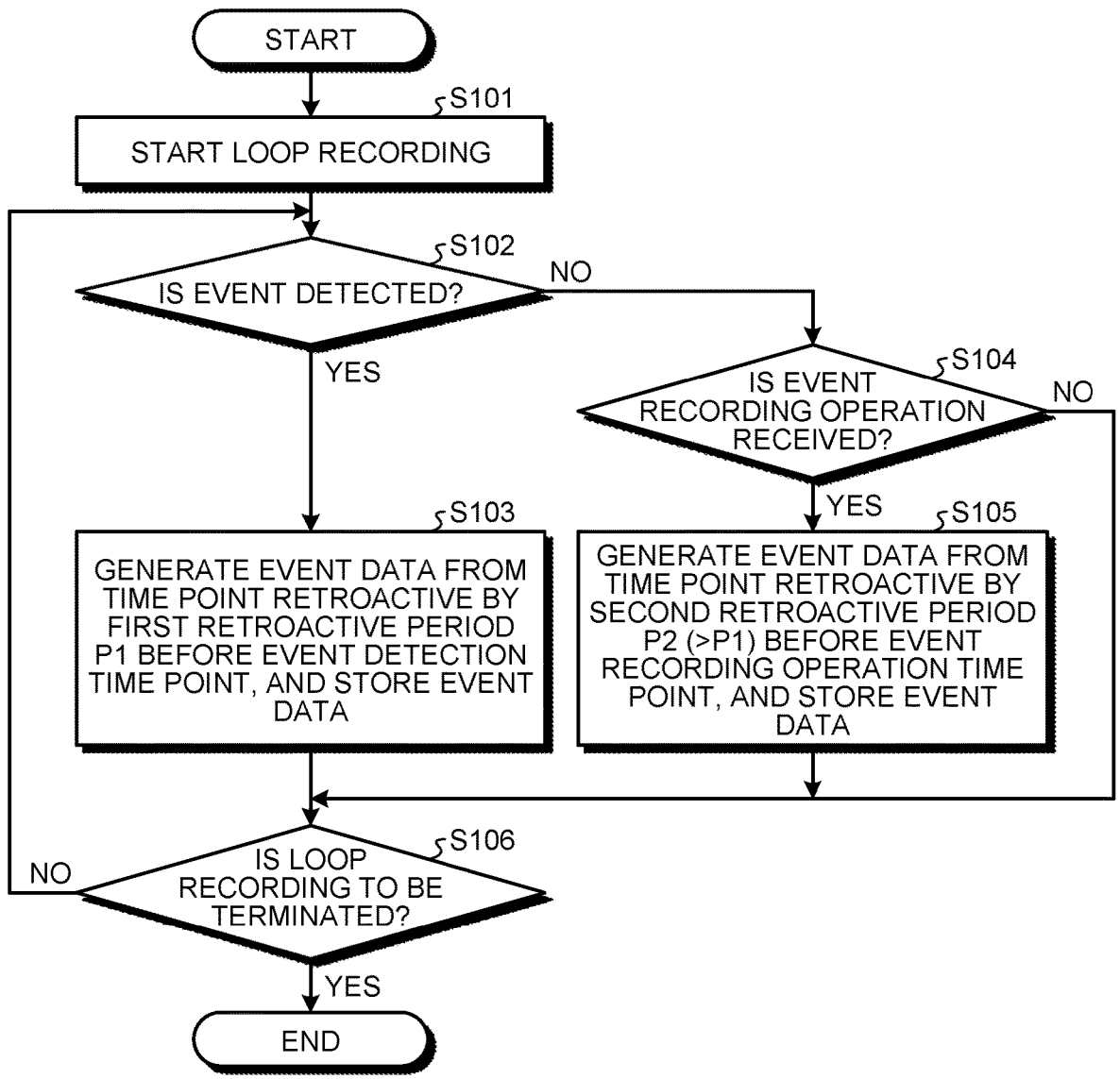
FIG. 3 is a flowchart illustrating an example of a flow of processes performed by the control apparatus according to the first embodiment.

A flow of processes performed by the control apparatus 100 will be described below with reference to FIG. 3. While the on-vehicle recording apparatus 10 is activated, the processes in the flowchart illustrated in FIG. 3 are performed.

The control apparatus 100 starts to perform loop recording (Step S101). More specifically, the captured data processing unit 113 starts to perform loop recording. Further, the control apparatus 100 starts to perform event detection. Start of event detection indicates detection of acceleration by the acceleration sensor 214 based on an acceleration threshold that is set by the event detection unit 117 and detection of receiving the event recording operation by the operation controller 116. The control apparatus 100 proceeds to Step S102.

The control apparatus 100 determines whether an event is detected based on a detection result obtained by the event detection unit 117 (Step S102). When the acceleration detected by the event detection unit 117 is equal to or larger than a threshold, it is determined that an event is detected (YES at Step S102), and the process proceeds to Step S103. Alternatively, when it is determined that the acceleration detected by the event detection unit 117 is not equal to or larger than the threshold, it is determined that an event is not detected (NO at Step S102), and the process proceeds to Step S104.

When it is determined that an event is detected (YES at Step S102), the recording controller 122 generates event data from a time point retroactive by the first retroactive period P1 before the event detection time point, and stores the event data (Step S103). More specifically, the recording controller 122 stores, in the recording unit 212, video data that is captured in a period from a time point retroactive by the first retroactive period P1 before the event detection time point to a time point elapsed by the first elapsed period P1' after the event detection time point, as event data for which overwrite is prohibited. The control apparatus 100 proceeds to Step S106.

When it is not determined that an event is detected (NO at Step S102), it is determined whether event recording operation is received (Step S104). When it is determined that the operation controller 116 has received the event recording operation based on user operation (YES at Step S104), the process proceeds to Step S105. When it is not determined that the operation controller 116 has received the event recording operation based on user operation (NO at Step S104), the process proceeds to Step S106.

When it is determined that the event recording operation has received (YES at Step S104), the recording controller 122 generates event data from a time point retroactive by the second retroactive period P2 before the event operation reception time point, and stores the event data (Step S105). More specifically, the recording controller 122 stores, in the recording unit 212, video data that is captured in a period from a time point retroactive by the second retroactive period P2 before the event operation reception time point to a time point elapsed by the second elapsed period P2' after the event operation reception time point, as event data for which overwrite is prohibited. The control apparatus 100 proceeds to Step S106.

The control apparatus 100 determines whether to terminate the loop recording (Step S106). For example, it is determined that the loop recording is to be terminated when a power source or a driving source of the vehicle is turned off or when certain operation is performed on the operation unit 213. When it is determined that the loop recording is to be terminated (YES at Step S106), the control apparatus 100 terminates the processes. When it is not determined that the loop recording is to be terminated (NO at Step S106), the control apparatus 100 performs the process at Step S102 again.

As described above, in the present embodiment, when the event recording operation is received, event data is stored for which the second retroactive period P2 from the event operation reception time point is longer than the first retroactive period P1 for the event detection from the event detection time point. According to the present embodiment, when event recording is performed based on user operation, it is possible to generate event data of a longer retroactive period as compared to a case in which event recording is performed based on the event detection, and store the event data. According to the present embodiment, when a time lag occurs from a user recognition of an evet that the user wants to store as event data to a user operation, it is possible to prevent a situation in which the event or the like is not appropriately recorded in the recorded event data. In this manner, according to the present embodiment, it is possible to appropriately record an event.

Second Embodiment

Figure 4:
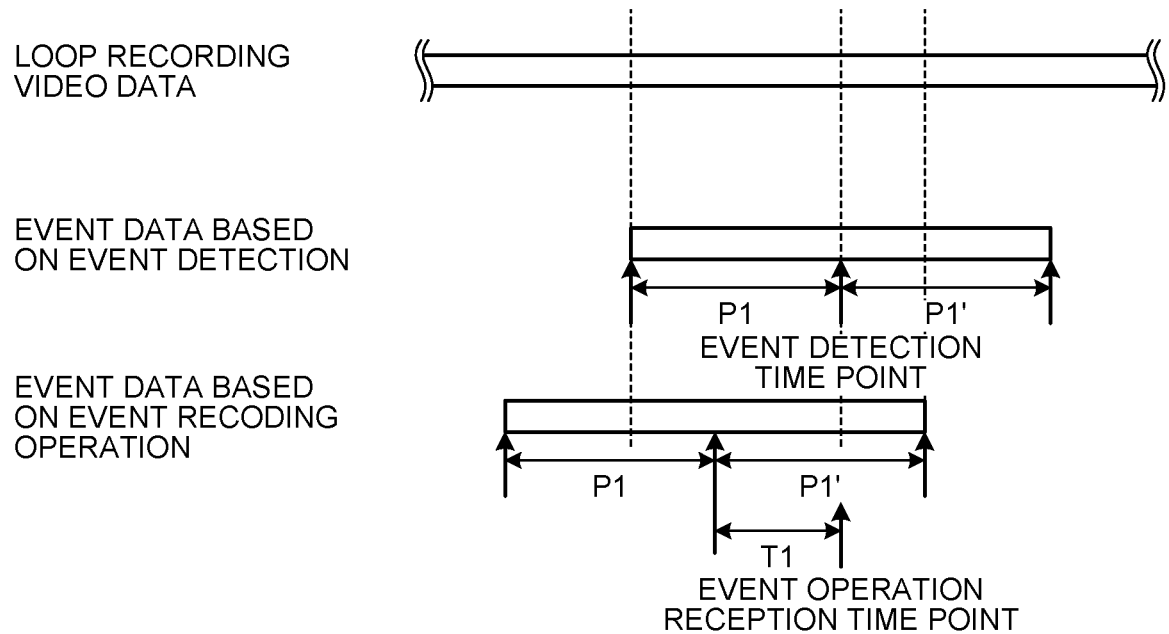
FIG. 4 is a diagram illustrating another example of the recording period of the event data.
Figure 5:
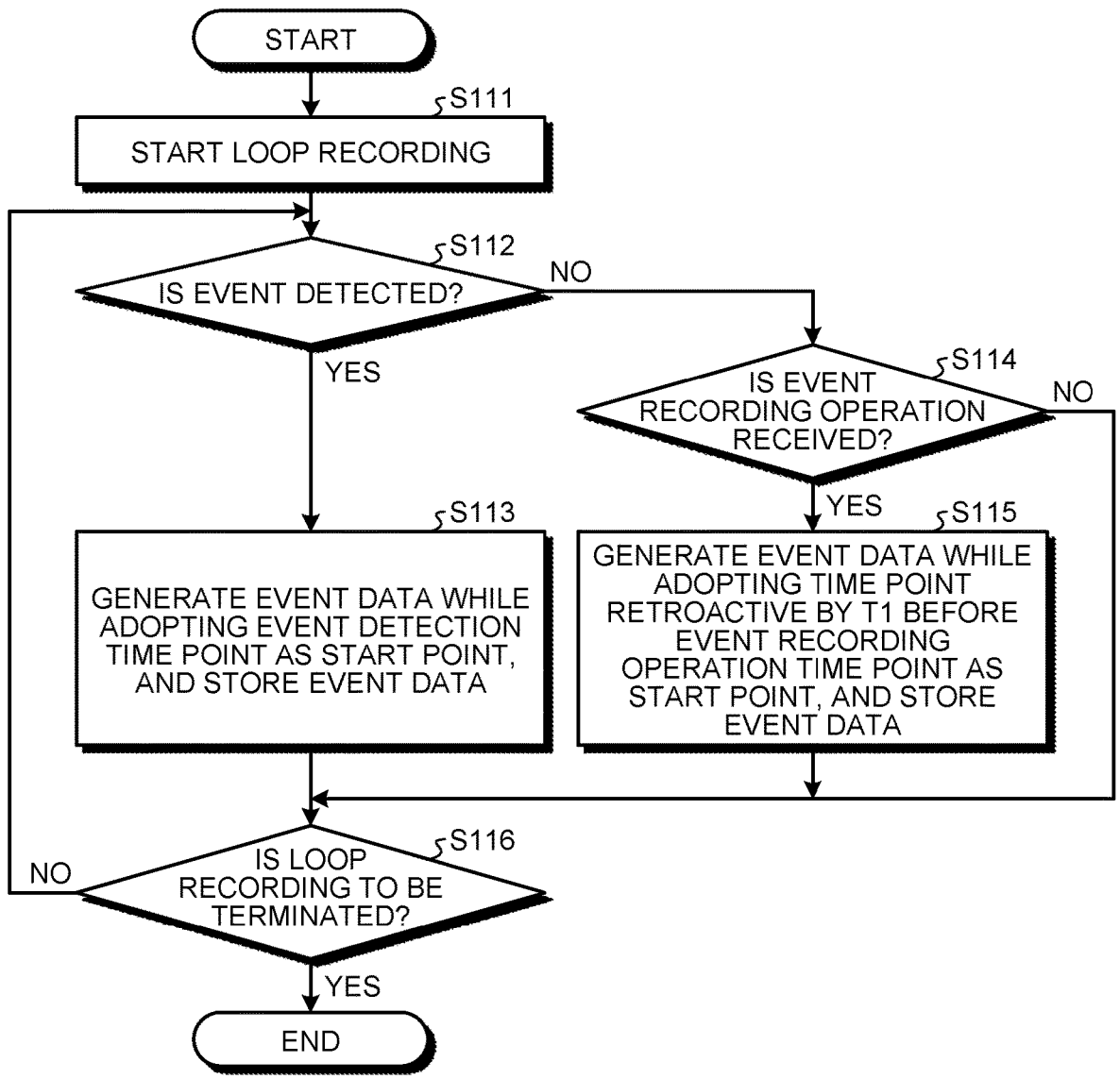
FIG. 5 is a flowchart illustrating an example of a flow of processes performed by a control apparatus according to a second embodiment.

An on-vehicle recording apparatus 10 according to a second embodiment will be described below with reference to FIG. 4 and FIG. 5. FIG. 4 is a diagram illustrating another example of the event data recording period. FIG. 5 is a flowchart illustrating an example of a flow of processes performed by a control apparatus according to the second embodiment. A basic configuration of the on-vehicle recording apparatus 10 is the same as the on-vehicle recording apparatus 10 of the first embodiment. In the explanation below, the same components as those of the on-vehicle recording apparatus 10 are denoted by the same reference symbols or corresponding symbols, and detailed explanation thereof will be omitted. In the present embodiment, processes performed by the recording controller 122 is different from those of the first embodiment.

When the event detection unit 117 detects an event, the recording controller 122 stores, as event data, video data of a predetermined period before and after a first start point of event recording, where the event detection time is adopted as the first start point. When the operation controller 116 receives event recording operation, the recording controller 122 sets a second start point of event recording to a time point retroactive by a predetermined time T1 before the event operation reception time point, and stores video data of a predetermined period before and after the second start point as event data.

The event data recording period will be described below with reference to FIG. 4. A period of event data that is generated based on event detection is a predetermined period before and after the first start point, where the event detection time point is adopted as the first start point. Specifically, the period of event data that is generated based on event detection is a period from a time point retroactive by the first retroactive period P1 before the first start point to a time point elapsed by the first elapsed period P1' after the first start point. A period of event data that is generated by event recording operation is a predetermined period before and after the second start point retroactive by the predetermined time T1 before the event operation reception time point. Specifically, the period of event data that is generated by event recording operation is a period from a time point retroactive by the first retroactive period P1 before the second start point to a time point elapsed by the first elapsed period P1' after the second start point. The period of event data based on event recording operation is the same length as the period of event data based on event detection. For example, T1 is set to 5 seconds or the like, and the first retroactive period P1 and the first elapsed period P1' are set to 10 seconds or the like.

A flow of processes performed by the control apparatus 100 will be described below with reference to FIG. 5. Processes at Step S111, Step S112, Step S114, and Step S116 are the same as the processes at Step S101, Step S102, Step S104, and Step S106 in the flowchart illustrated in FIG. 3.

When it is determined that an event is detected (YES at Step S112), the recording controller 122 generates event data while adopting the event detection time point as a start point, and stores the event data (Step S113). More specifically, the recording controller 122 stores, in the recording unit 212, video data captured in a period from a time point retroactive by the first retroactive period P1 before the first start point to a time point elapsed by the first elapsed period P1' after the first start point while adopting the event detection time point as the first start point, as event data for which overwrite is prohibited. The control apparatus 100 proceeds to Step S116.

When it is determined that the event recording operation is received (YES at Step S114), the recording controller 122 generates event data while adopting a time point retroactive by T1 before the event operation reception time point as a start point, and stores the event data (Step S115). More specifically, the recording controller 122 stores, in the recording unit 212, video data that is captured in a period from a time point retroactive by the first retroactive period P1 before the second start point to a time point elapsed by the first elapsed period P1' after the second start point while adopting a time point retroactive by the predetermined time T1 before the event operation reception time point as the second start point, as event data for which overwrite is prohibited. The control apparatus 100 proceeds to Step S116.

As described above, in the present embodiment, when an event is detected, video data of a predetermined period before and after the first start point is stored as event data while adopting an event detection time as the first start point of event recording. In the present embodiment, when the event recording operation is received, the second start point of event recording is set to a time point retroactive by the predetermined time T1 before the event operation reception time point, and video data of a predetermined period before and after the second start point is stored as event data. According to the present embodiment, when the event recording operation is received, it is possible to shift the period of the event data to a time point retroactive by the predetermined time T1 before the event operation reception time point.

Third Embodiment

Figure 6:
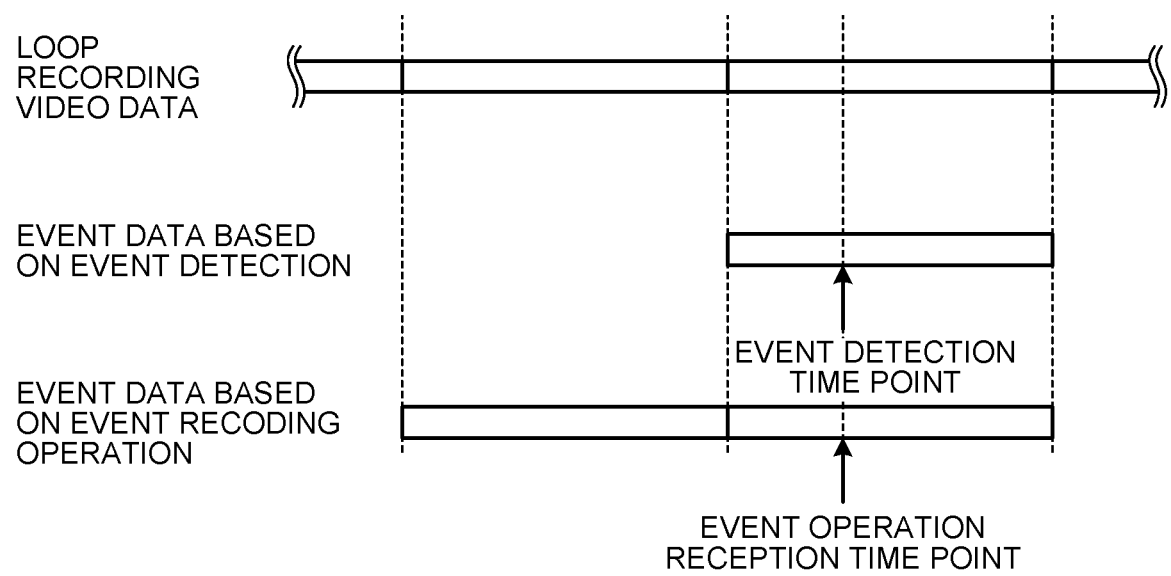
FIG. 6 is a diagram illustrating another example of the event data recording period.
Figure 7:
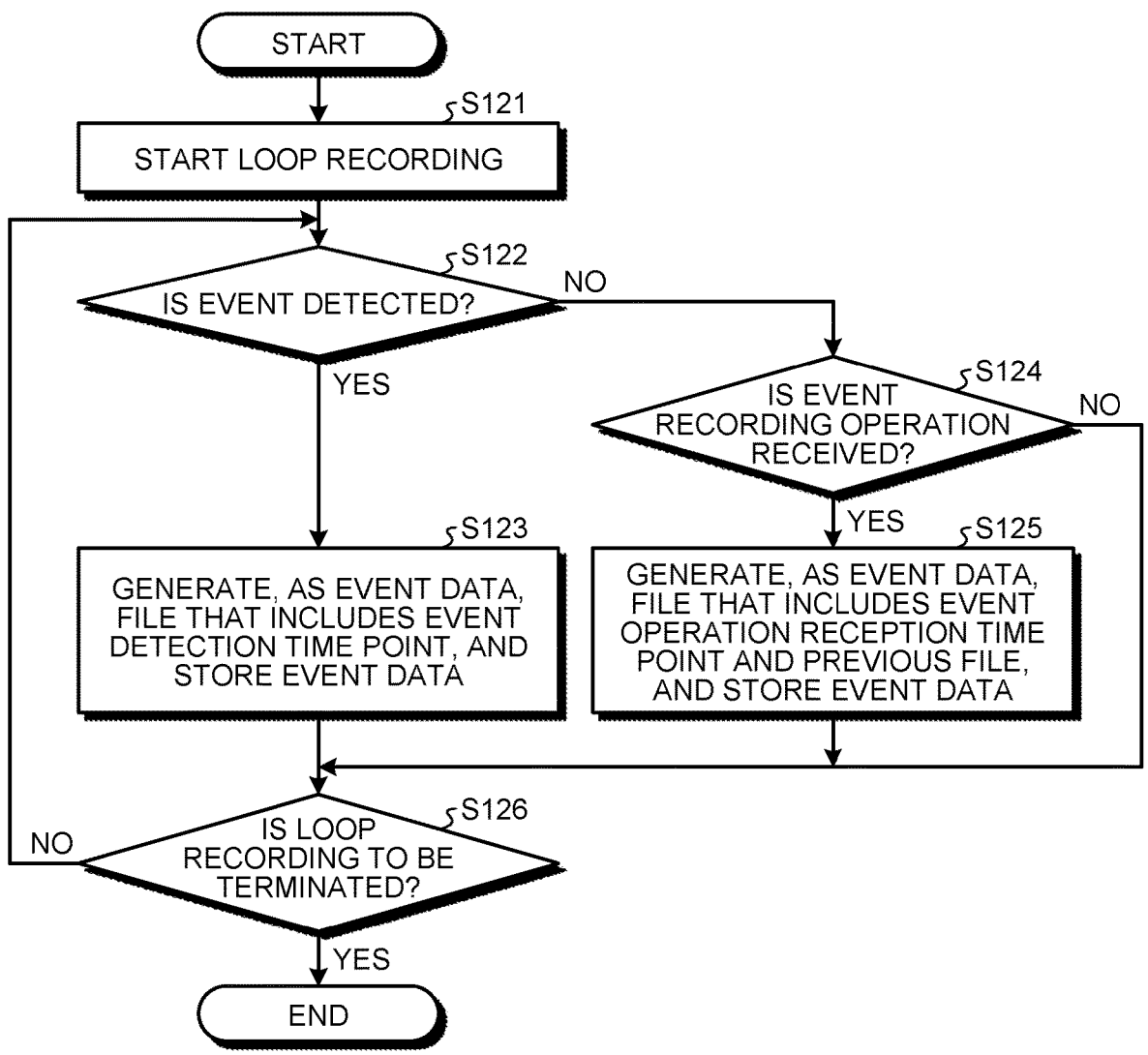
FIG. 7 is a flowchart illustrating an example of a flow of processes performed by a control apparatus according to a third embodiment.

An on-vehicle recording apparatus 10 according to a third embodiment will be described below with reference to FIG. 6 and FIG. 7. FIG. 6 is a diagram illustrating still another example of the event data recording period. FIG. 7 is a flowchart illustrating an example of a flow of processes performed by a control apparatus according to the third embodiment. In the present embodiment, processes performed by the recording controller 122 are different from those of the first embodiment.

When the event detection unit 117 detects an event, the recording controller 122 stores, as event data, a file that includes the event detection time point, and, when the operation controller 116 receives event recording operation, the recording controller 122 stores, as event data, an immediately previous file in addition to the file that includes the event operation reception time point.

The event data recording period will be described below with reference to FIG. 6. A period of event data that is generated based on event detection is a period of a file that includes the event detection time point. For example, when a period of video data generated as a single file is 60 seconds, the period of event data that is generated based on event detection is 60 seconds. A period of event data generated by event recording operation is a period of both of a file that includes the event operation reception time point and a file that is previous to the file that includes the event operation reception time point. For example, when a period of video data that is generated as a single file is 60 seconds, the period of event data based on the event recording operation is 120 seconds.

A flow of processes performed by the control apparatus 100 will be described below with reference to FIG. 7. Processes at Step S121, Step S122, Step S124, and Step S126 are the same as the processes at Step S101, Step S102, Step S104, and Step S106 in the flowchart illustrated in FIG. 3.

When it is determined that an event is detected (YES at Step S122), the recording controller 122 generates a file that includes the event detection time point as event data, and stores the event data (Step S123). More specifically, the recording controller 122 stores, in the recording unit 212, a file that includes the event detection time point as event data for which overwrite is prohibited. The control apparatus 100 proceeds to Step S126.

When it is determined that the event recording operation is received (YES at Step S124), the recording controller 122 generates a file that includes the event operation reception time point and a file that is previous to the file that includes the event operation reception time point as event data, and stores the event data (Step S125). More specifically, the recording controller 122 stores, in the recording unit 212, the file that includes the event operation reception time point and the file that is previous to the file that includes the event operation reception time point as event data for which overwrite is prohibited. The control apparatus 100 proceeds to Step S126.

As described above, in the present embodiment, when an event is detected, a file that includes the event detection time point is stored as event data. In the present embodiment, when the event recording operation is received, the file that includes the event operation reception time point and the previous file are stores as event data. According to the present embodiment, when the event recording operation is received, it is possible to increase the period of the event data as compared to a case in which an event is detected.

Fourth Embodiment

Figure 8:
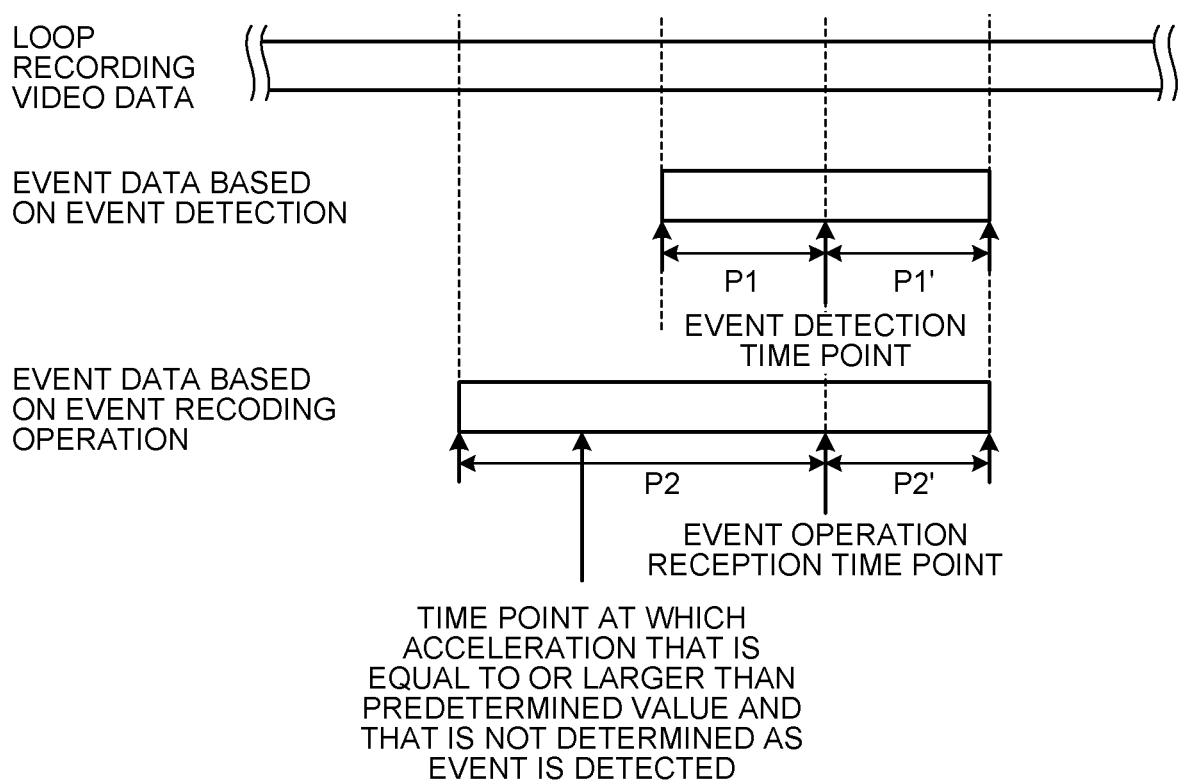
FIG. 8 is a diagram illustrating still another example of the event data recording period.
Figure 9:
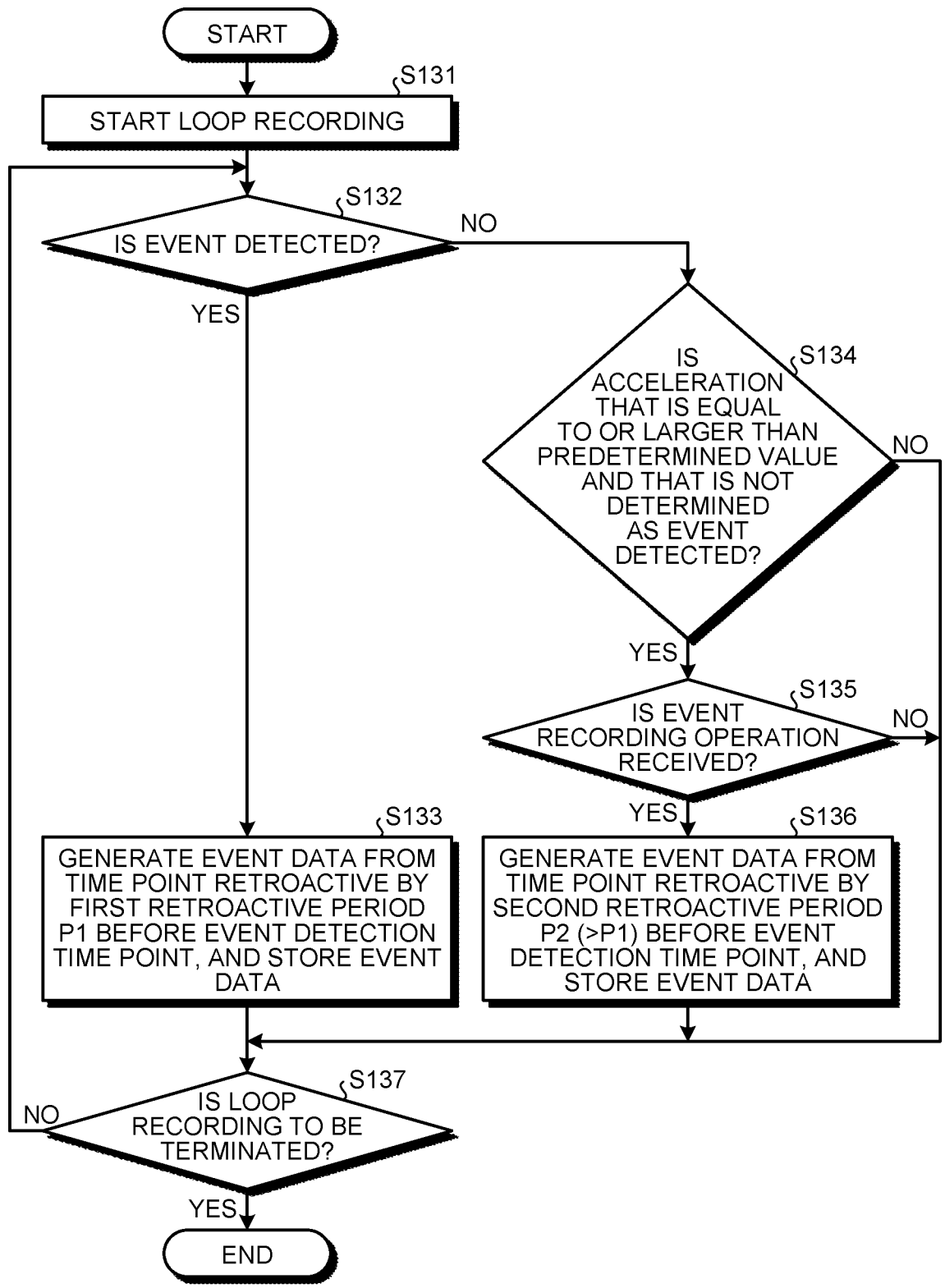
FIG. 9 is a flowchart illustrating an example of a flow of processes performed by a control apparatus according to a fourth embodiment.

An on-vehicle recording apparatus 10 according to a fourth embodiment will be described below with reference to FIG. 8 and FIG. 9. FIG. 8 is a diagram illustrating still another example of the event data recording period. FIG. 9 is a flowchart illustrating an example of a flow of processes performed by a control apparatus according to the fourth embodiment. In the present embodiment, processes performed by the recording controller 122 are different from those of the first embodiment.

When the operation controller 116 receives event recording operation after detection of acceleration that is equal to or larger than a predetermined value and that is not determined as an event by the event detection unit 117, the recording controller 122 generates, from video data, event data of a longer retroactive period as compared to a case in which the event detection unit 117 detects an event, and stores the event data. More specifically, when the event recording operation is received within a predetermined period after detection of acceleration that is equal to or larger than the predetermined value and that is not determined as an event, the recording controller 122 generate, from the video data, event data of a longer retroactive period as compared to a case in which an event is detected. The predetermined period is, for example, a period of equal to or longer than about 30 seconds and equal to or shorter than about 120 seconds.

The acceleration that is equal to or larger than the predetermined value and that is not determined as an event is acceleration that is smaller than acceleration that is detected as an event. The acceleration that is equal to or larger than the predetermined value and that is not determined as an event is, when detection of acceleration of 1.0 G or larger is determined as an event, acceleration of 0.5 G or more and less than 1.0 G. Specifically, the acceleration that is equal to or larger than the predetermined value and that is not determined as an event corresponds to a state in which acceleration equal to or larger than the predetermined value and smaller than the acceleration determined as an event is applied to the own vehicle due to collision between the own vehicle and an object or sudden braking.

The event data recording period will be described below with reference to FIG. 8. A period of event data that is generated based on event detection is a predetermined period before and after the first start point, where the event detection time point is adopted as the first start point. Specifically, the period of event data that is generated based on event detection is a period from a time point retroactive by the first retroactive period P1 before the first start point to a time point elapsed by the first elapsed period P1' after the first start point.

A period of event data that is generated by event recording operation is a period before and after the second start point, where the event operation reception time point is adopted as the second start point when the event recording operation is received within a predetermined period after detection of acceleration that is equal to or larger than the predetermined value and that is not determined as an event by the event detection unit 117. Specifically, the period of event data that is generated by event recording operation is a period from a time point retroactive by the second retroactive period P2 (P1<P2) before the second start point to a time point elapsed by the second elapsed period P2' after the second start point. The period of event data based on event recording operation is longer than the period of event data based on event detection. The second retroactive period P2 is set to 20 seconds and the second elapsed period P2' is set to 10 seconds, for example. It is preferable that the second retroactive period P2 is a period that includes a time point at which acceleration that is equal to or larger than the predetermined value and that is not determined as an event is detected from the second start point.

A flow of processes performed by the control apparatus 100 will be described below with reference to FIG. 9. Processes from Step S131 to Step S133 and Step S135 to Step S137 are the same as the processes from Step S101 to Step S103 and Step S104 to Step S106 in the flowchart illustrated in FIG. 3.

When it is not determined that an event is detected (NO at Step S132), the control apparatus 100 determines whether acceleration that is equal to or larger than the predetermined value and that is not determined as an event is detected based on a detection result of the event detection unit 117 (Step S134). When the acceleration detected by the event detection unit 117 is equal to or larger than the predetermined value and not determined as an event (YES at Step S134), the process proceeds to Step S135. Alternatively, when it is determined that the acceleration detected by the event detection unit 117 is not acceleration that is equal to or larger than the predetermined value and that is not determined as an event (NO at Step S134), the process proceeds to Step S137.

As described above, in the present embodiment, when the event recording operation is received after detection of acceleration that is equal to or larger than the predetermined value and that is not determined as an event, event data is retroactively generated, from video data, for a longer period from the event operation reception time point that serves as a start point, as compared to a case in which an event is detected. According to the present embodiment, when the event recording operation is received after detection of acceleration that is equal to or larger than the predetermined value and that is not determined as an event, it is possible to increase the period of event data while adopting the event operation reception time point as a start point, as compared to a case in which an event is detected.

Fifth Embodiment

Figure 10:
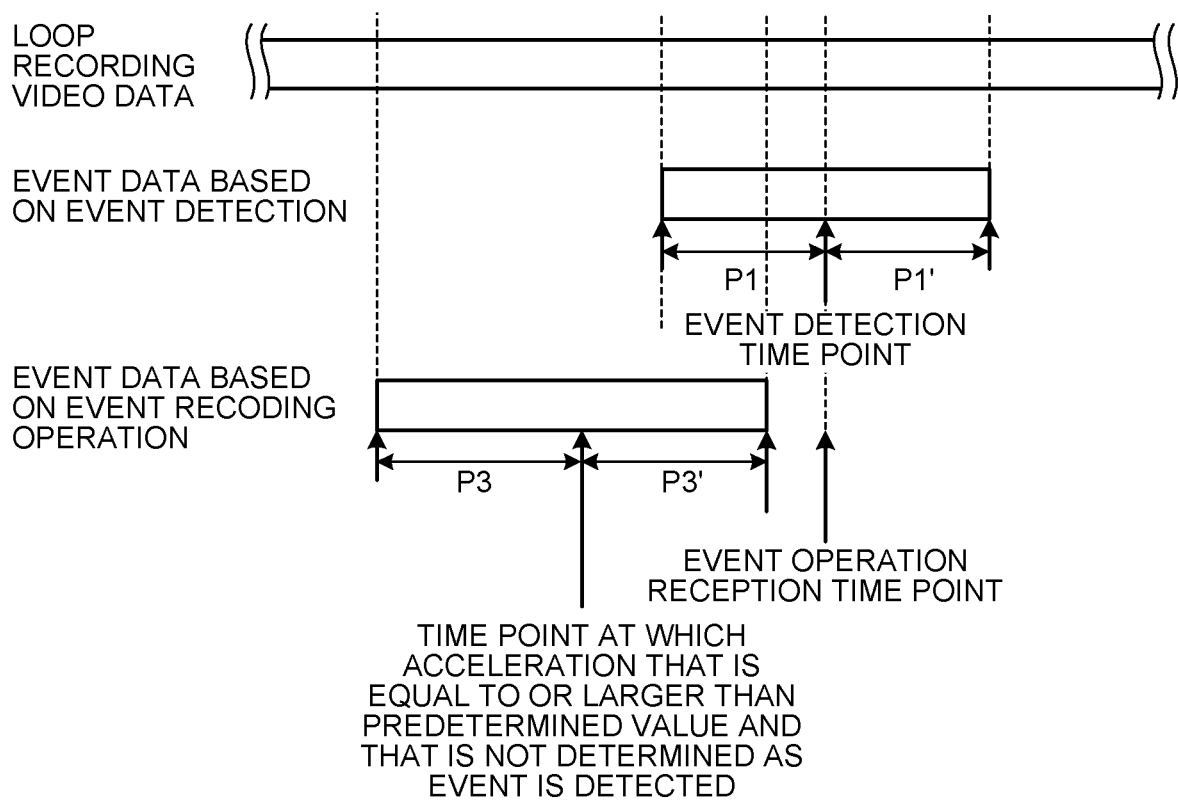
FIG. 10 is a diagram illustrating still another example of the event data recording period.
Figure 11:
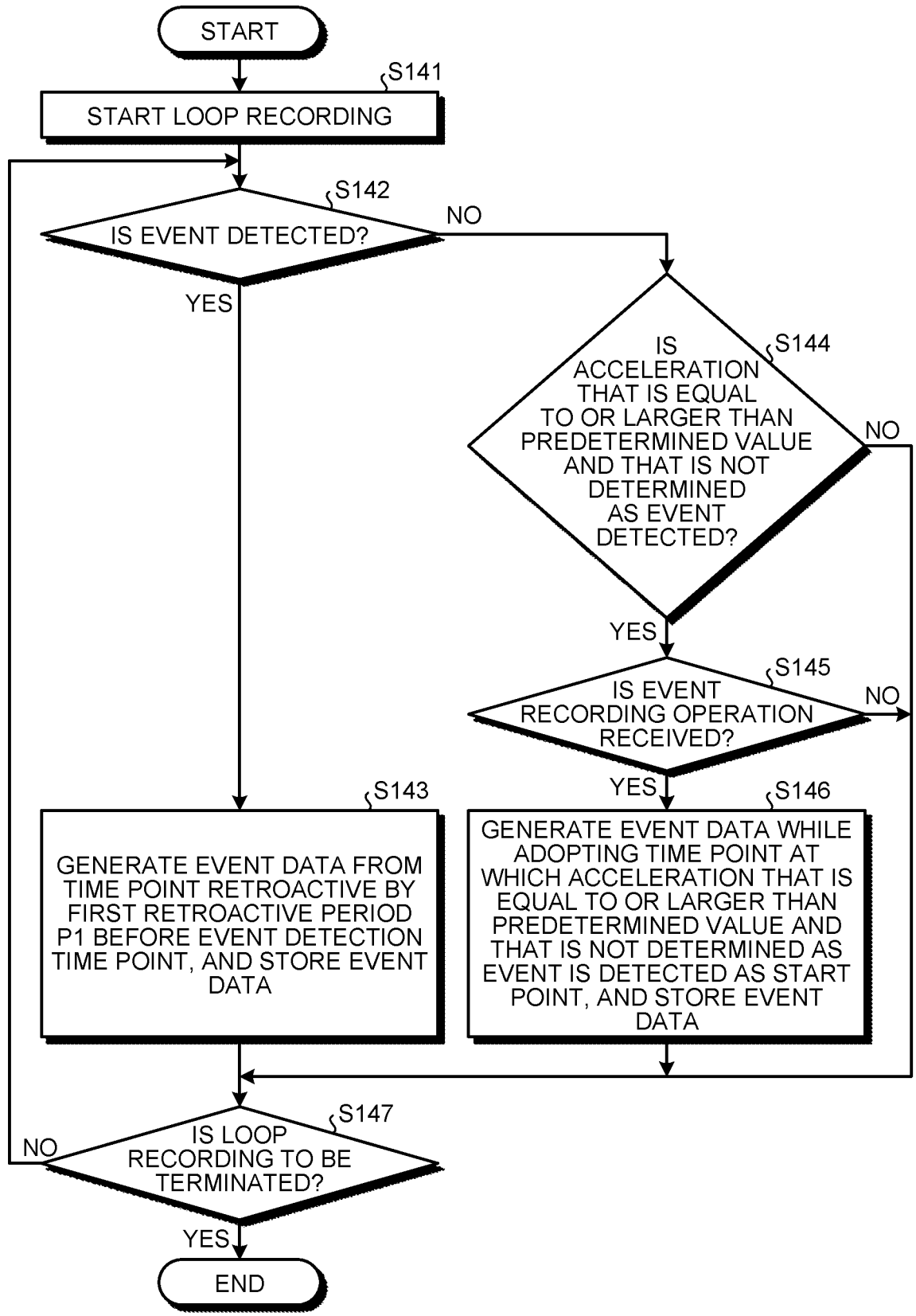
FIG. 11 is a flowchart illustrating an example of a flow of processes performed by a control apparatus according to a fifth embodiment.

An on-vehicle recording apparatus 10 according to a fifth embodiment will be described below with reference to FIG. 10 and FIG. 11. FIG. 10 is a diagram illustrating still another example of the event data recording period. FIG. 11 is a flowchart illustrating an example of a flow of processes performed by a control apparatus according to the fifth embodiment. In the present embodiment, processes performed by the recording controller 122 are different from those of the first embodiment.

When the event detection unit 117 detects an event, the recording controller 122 stores video data of a predetermined period before and after the first start point while adopting an event detection time as the first start point of event recording, and, when the operation controller 116 receives the event recording operation after detection of acceleration that is equal to or larger than the predetermined value and that is not determined as an event by the event detection unit 117, the recording controller 122 generates event data from video data of a predetermined period before and after a third start point while adopting a time point at which the acceleration that is equal to or larger than the predetermined value and that is not determined as an event by the event detection unit 117 is detected as the third start point, and stores the event data.

The event data recording period will be described below with reference to FIG. 10. A period of event data that is generated based on event detection is a predetermined period before and after the first start point, where the event detection time point is adopted as the first start point.

Specifically, the period of event data that is generated based on event detection is a period from a time point retroactive by the first retroactive period P1 before the first start point to a time point elapsed by the first elapsed period P1' after the first start point. A period of event data that is generated by event recording operation is a predetermined period before and after the third start point while adopting, as the third start point, a time point at which the acceleration that is equal to or larger than the predetermined value is detected and that is not determined as an event is detected, when the event recording operation is received within a predetermined period after detection of the acceleration that is equal to or larger than the predetermined value and that is not determined as an event by the event detection unit 117. Specifically, the period of event data that is generated by event recording operation is a period from a time point retroactive by a third retroactive period P3 (P1<P3) before the third start point to a time point elapsed by a third elapsed period P3' (P1'<P3') after the third start point. The period of event data based on event recording operation is longer than the period of the event data based on event detection. The third retroactive period P3 and the third elapsed period P3' are set to 15 seconds, for example.

A flow of processes performed by the control apparatus 100 will be described below with reference to FIG. 11. Processes from Step S141 to Step S143 and at Step S145 and Step S147 are the same as the processes from S101 to Step S103 and from Step S104 and Step S106 in the flowchart illustrated in FIG. 3. A process at Step S144 is the same as the process at Step S134 in the flowchart illustrated in FIG. 9.

When it is determined that the event recording operation is received (YES at Step S145), the recording controller 122 generates event data while adopting a time point at which acceleration that is equal to or larger than the predetermined value and that is not determined as an event is detected as a start point, and stores the event data (Step S146). More specifically, the recording controller 122 stores, in the recording unit 212, video data that is captured in a period from a time point retroactive by the third retroactive period P3 before the time point at which the acceleration that is equal to or larger than the predetermined value and that is not determined as an event is detected to a time point elapsed by the third elapsed period P3' after the time point at which the acceleration that is equal to or larger than the predetermined value and that is not determined as an event is detected, as event data for which overwrite is prohibited. The control apparatus 100 proceeds to Step S147.

As described above, in the present embodiment, when the event recording operation is received after detection of the acceleration that is equal to or larger than the predetermined value and that is not determined as an event, event data is retroactively generated from video data for a longer period as compared to a case in which an event is detected while adopting the time point at which the acceleration that is equal to or larger than the predetermined value and that is not determined as an event is detected as a start point. According to the present embodiment, when the event recording operation is received after detection of the acceleration that is equal to or larger than the predetermined value and that is not determined as an event, it is possible to increase, as compared to a case in which an event is detected, the period of event data while adopting the time point at which the acceleration that is equal to or larger than the predetermined value and that is not determined as an event is detected as a start point.

Sixth Embodiment

On-Vehicle Recording Apparatus

Figure 12:
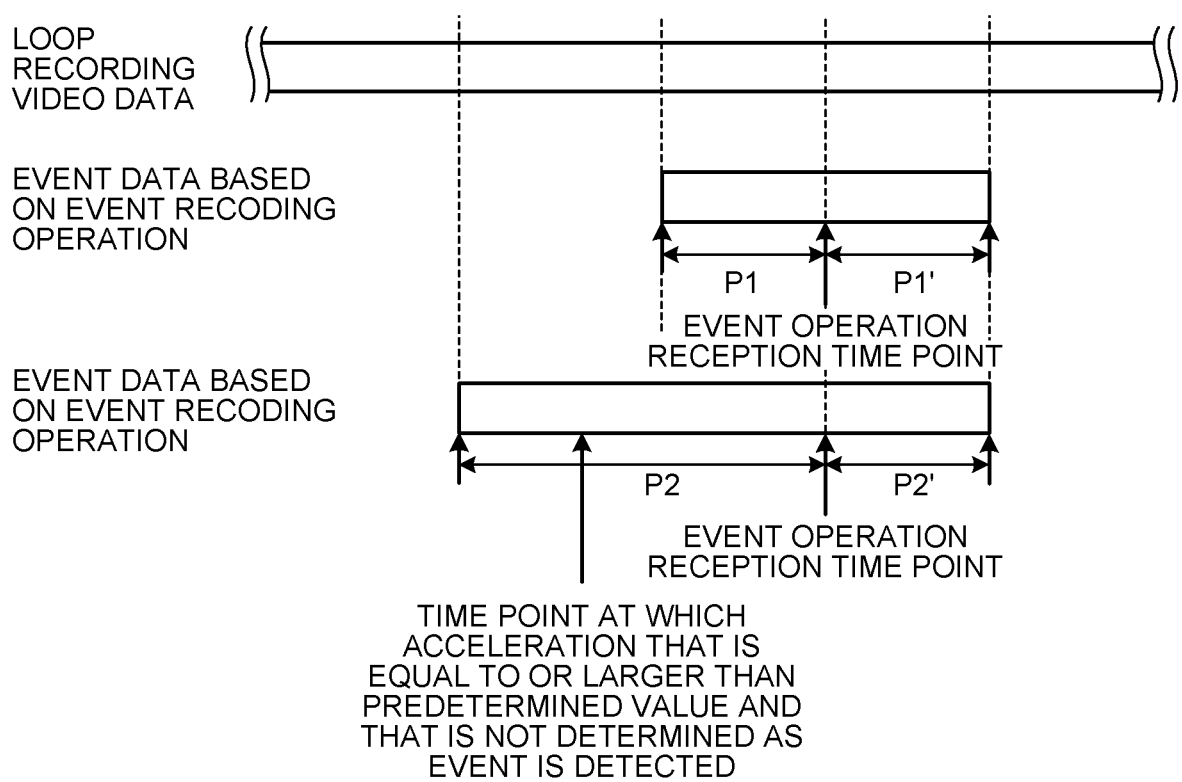
FIG. 12 is a diagram illustrating still another example of the event data recording period.

An on-vehicle recording apparatus 10 according to a sixth embodiment will be described below with reference to FIG. 12 and FIG. 13. FIG. 12 is a diagram illustrating still another example of the event data recording period. FIG. 13 is a flowchart illustrating an example of a flow of processes performed by a control apparatus according to the sixth embodiment. In the present embodiment, processes performed by the recording controller 122 are different from those of the first embodiment.

When acceleration that is equal to or larger than the predetermined value and that is not determined as an event is detected before receiving the event recording operation, the on-vehicle recording apparatus 10 generates, from the video data, event data of a longer retroactive period as compared to a case in which the acceleration that is equal to or larger than the predetermined value and that is not determined as an event is not detected before receiving the event recording operation, and stores the event data.

The recording controller 122 records the video data acquired by the captured data acquisition unit 111, and, when the operation controller 116 receives the event recording operation and when the acceleration that is equal to or larger than the predetermined value and that is not determined as an event by the event detection unit 117 is detected within a predetermined period before the event operation reception time point, the recording controller 122 generates, from the video data, event data of a longer retroactive period as compared to a case in which the acceleration that is equal to or larger than the predetermined value and that is not determined as an event by the event detection unit 117 is not detected within the predetermined period before the event operation reception time point, and stores the event data.

The predetermined period is, for example, 30 seconds to 120 seconds, for example.

When the operation controller 116 receives the event recording operation and the acceleration that is equal to or larger than the predetermined value and that is not determined as an event is detected within the predetermined period before the event operation reception time point, the recording controller 122 generates, from the video data, event data of a longer retroactive period as compared to a case in which the acceleration that is equal to or larger than the predetermined value and that is not determined as an event is not detected within the predetermined period before the event operation reception time point, and stores the event data. In other words, when the acceleration that is equal to or larger than the predetermined value and that is not determined as an event is detected within the predetermined period before the event operation reception time point, the recording controller 122 stores event data for which a retroactive period from the event operation reception time point is longer as compared to a case in which the acceleration that is equal to or larger than the predetermined value and that is not determined as an event is not detected within the predetermined period before the event operation reception time point.

In the present embodiment, the recording controller 122 generates and stores, from the video data, event data for the second retroactive period P2 from the event recording operation reception time point, when the acceleration that is equal to or larger than the predetermined value and that is not determined as an event by the event detection unit 117 is detected within the predetermined period before receiving the event recording operation, that is longer than the first retroactive period P1 from the event recording operation reception time point, when the acceleration that is equal to or larger than the predetermined value and that is not determined as an event by the event detection unit 117 is not detected within the predetermined period before receiving the event recording operation. More specifically, when the acceleration that is equal to or larger than the predetermined value and that is not determined as an event is detected within the predetermined period before the event operation reception time point, the recording controller 122 stores event data for the second retroactive period P2 (P1<P2) from the event operation reception time point that is longer than the first retroactive period P1 from the event detection time point when the acceleration that is equal to or larger than the predetermined value and that is not determined as an event is not detected within the predetermined period before the event operation reception time point. For example, the recording controller 122 generates, from the video data, event data of a period from a time point retroactive by the second retroactive period P2 before the event operation reception time point to a time point elapsed by the second elapsed period P2' (P1'=P2') after the event operation reception time point, and stores the event data.

The event data recording period will be described below with reference to FIG. 12. A period of event data that is generated by the event recording operation when the acceleration that is equal to or larger than the predetermined value and that is not determined as an event is not detected within the predetermined period before the event operation reception time point is a period from a time point retroactive by the first retroactive period P1 before the event operation reception time point to a time point elapsed by the first elapsed period P1' after the event operation reception time point. A period of event data that is generated by the event recording operation when the acceleration that is equal to or larger than the predetermined value and that is not determined as an event is detected within the predetermined period before the event operation reception time point is a period from a time point retroactive by the second retroactive period P2 before the event operation reception time point to a time point elapsed by the second elapsed period P2' after the event operation reception time point. The period of event data that is generated by the event recording operation when the acceleration that is equal to or larger than the predetermined value and that is not determined as an event is detected within the predetermined period before the event operation reception time point is longer than the period of event data based on the event recording operation when the acceleration that is equal to or larger than the predetermined value and that is not determined as an event is not detected within the predetermined period before the event operation reception time point. For example, when the first retroactive period P1 is 10 seconds, the second retroactive period P2 is set to 15 seconds to 20 seconds of the like. Further, the first elapsed period P1' and the second elapsed period P2' are set to 10 seconds or the like.

Information Processing Performed by On-Vehicle Recording Control Apparatus

A flow of processes performed by the control apparatus 100 will be described below with reference to FIG. 13. While the on-vehicle recording apparatus 10 is activated, processes in the flowchart illustrated in FIG. 13 are performed. Processes from Step S201 to Step S204 and at Step S208 are the same as the processes from Step S101 to Step S104 and at Step S106 in the flowchart illustrated in FIG. 3.

When it is determined that the event recording operation is received (YES at Step S204), the control apparatus 100 determines whether the acceleration that is equal to or larger than the predetermined value and that is not determined as an event is detected within a predetermined period before receiving the event recording operation (Step S205). When the control apparatus 100 determines that the acceleration that is equal to or larger than the predetermined value and that is not determined as an event is detected within the predetermined period before receiving the event recording operation (YES at Step S205), the process proceeds to Step S206. When the control apparatus 100 does not determine that the acceleration that is equal to or larger than the predetermined value and that is not determined as an event is detected within the predetermined period before receiving the event recording operation (NO at Step S205), the process proceeds to Step S207.

when it is determined that the acceleration that is equal to or larger than the predetermined value and that is not determined as an event is detected within the predetermined period before receiving the event recording operation (YES at Step S205), the recording controller 122 generates event data of the second retroactive period P2 before the event operation reception time point, and stores the event data (Step S206). More specifically, the recording controller 122 stores, in the recording unit 212, the video data that is captured in a period from a time point retroactive by the second retroactive period P2 before the event operation reception time point to a time point elapsed by the second elapsed period P2' after the event operation reception time point, as event data for which overwrite is prohibited. The control apparatus 100 proceeds to Step S208.

When it is not determined that the acceleration that is equal to or larger than the predetermined value and that is not determined as an event is detected within the predetermined period before the event operation reception time point (NO at Step S205), the recording controller 122 generates event data of the first retroactive period P1 from the event recording operation time point, and stores the event data (Step S207). More specifically, the recording controller 122 stores, in the recording unit 212, the video data that is captured in a period from a time point retroactive by the first retroactive period P1 before the event operation reception time point to a time point elapsed by the first elapsed period P1' after the event operation reception time point, as event data for which overwrite is prohibited. The control apparatus 100 proceeds to Step S208.

As described above, in the present embodiment, when the event recording operation is received and the acceleration that is equal to or larger than the predetermined value and that is not determined as an event is detected within the predetermined period before the event operation reception time point, it is possible to generate, from the video data, event data of a longer retroactive period as compared to a case in which the acceleration that is equal to or larger than the predetermined value and that is not determined as an event is not detected within the predetermined period before the event operation reception time point, and store the event data. According to the present embodiment, when a user is not able to promptly give an instruction for event recording and a time lag occurs from the user recognition of an event that the user wants to store as event data to the user operation, it is possible to prevent a situation in which the event or the like is not appropriately recorded in recorded event data. In this manner, according to the present embodiment, it is possible to appropriately record an event.

The present embodiment is able to generate, from video data, event data for the second retroactive period P2 from the event operation reception time point when the acceleration that is equal to or larger than the predetermined value and that is not determined as an event is detected within the predetermined period from the event operation reception time point, that is longer than the first retroactive period P1 before the event recording operation reception time point when the acceleration that is equal to or larger than the predetermined value and that is not determined as an event is not detected within the predetermined period before the event operation reception time point, and store the event data.

Seventh Embodiment

An on-vehicle recording apparatus 10 according to a seventh embodiment will be described below with reference to FIG. 14 and FIG. 15. FIG. 14 is a diagram illustrating still another example of the event data recording period. FIG. 15 is a flowchart illustrating an example of a flow of processes performed by a control apparatus according to the second embodiment. In the present embodiment, process performed by the recording controller 122 are different from those of the first embodiment.

When the acceleration that is equal to or larger than the predetermined value and that is not determined as an event by the event detection unit 117 is not detected within a predetermined period before receiving the event recording operation, the recording controller 122 stores, as event data, the video data of a predetermined period before and after a time point as a second start point at which the event recording operation is received, and when the acceleration that is equal to or larger than the predetermined value and that is not determined as an event by the event detection unit 117 is detected within the predetermined period before receiving the event recording operation, the recording controller 122 generates event data from the video data of a predetermined period before and after a time point as a third start point at which the acceleration that is equal to or larger than the predetermined value and that is not determined as an event by the event detection unit 117 is detected, and stores the event data.

The event data recording period will be described below with reference to FIG. 14. A period of event data in a case where the acceleration that is equal to or larger than the predetermined value and that is not determined as an event is not detected within the predetermined period before the event operation reception time point is a predetermined period before and after the second start point, where the event operation reception time point corresponds to the second start point. Specifically, the period of event data in this case is a period from a time point retroactive by the first retroactive period P1 before the second start point to a time point elapsed by the first elapsed period P1' after the second start point. A period of event data in a case where the acceleration that is equal to or larger than the predetermined value and that is not determined as an event is detected within the predetermined period before the event operation reception time point is a predetermined period before and after the third start point, where a time point at which the acceleration that is equal to or larger than the predetermined value and that is not determined as an event is detected corresponds to the third start point. Specifically, the period of event data in this case is a period from a time point retroactive by the third retroactive period P3 before the third start point to a time point elapsed by the third elapsed period P3' after the third start point. For example, the third retroactive period P3 and the third elapsed period P3' are set to 15 seconds to 20 seconds or the like. The second retroactive period P2 and the second elapsed period P2' are the same as those of the first embodiment.

A flow of processes performed by the control apparatus 100 will be described below with reference to FIG. 15. Processes from Step S211 to Step S215 and at Step S218 are the same as the processes from Step S201 to Step S205 and at Step S208 in the flowchart illustrated in FIG. 13.

When it is determined that the acceleration that is equal to or larger than the predetermined value and that is not determined as an event is detected within the predetermined period before receiving the event recording operation (YES at Step S215), the recording controller 122 stores, as event data, the video data of a predetermined period before and after the third start point that is a time point at which the acceleration that is equal to or larger than the predetermined value and that is not determined as an event is detected (Step S216). More specifically, the recording controller 122 generates event data from the video data that is captured in a period from a time point retroactive by the third retroactive period P3 before the third start point to a time point elapsed by the third elapsed period P3' after the third start point, and stores the event data in the recording unit 212. The control apparatus 100 proceeds to Step S218.

When it is not determined that the acceleration that is equal to or larger than the predetermined value and that is not determined as an event is detected within the predetermined period before receiving the event recording operation (NO at Step S215), the recording controller 122 stores, as event data, video data of a predetermined period before and after the second start point that is the event operation reception time point (Step S217). More specifically, the recording controller 122 stores, in the recording unit 212, the video data that is captured in a period from a time point retroactive by the second retroactive period P2 before the second start point to a time point elapsed by the second elapsed period P2' after the second start point, as event data. The control apparatus 100 proceeds to Step S218.

As described above, in the present embodiment, when the acceleration that is equal to or larger than the predetermined value and that is not determined as an event is not detected within the predetermined period before the event operation reception time point, the video data of a predetermined period before and after the second start point is stored as event data while adopting the event operation reception time point as the second start point, and, when the acceleration that is equal to or larger than the predetermined value and that is not determined as an event is detected within the predetermined period before the event operation reception time point, it is possible to generate and store event data from video data of a predetermined period before and after the third start point while adopting a time point at which the acceleration that is equal to or larger than the predetermined value and that is not determined as an event is detected as the third start point.

The on-vehicle recording apparatus 10 according to the present application may be embodied in various different modes other than the embodiments as described above.

The components of the on-vehicle recording apparatus 10 illustrated in the drawings are functionally conceptual and do not necessarily have to be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various processing loads or use conditions of the apparatuses.

The configuration of the on-vehicle recording apparatus 10 is realized as software by, for example, a program or the like loaded on a memory. In the embodiments described above, it is explained that the functional blocks are implemented by cooperation with hardware or software. In other words, the functional blocks are realized in various forms using only hardware, using only software, or using a combination of hardware and software.

The components described above include one that can easily be thought of by a person skilled in the art and one that is practically identical. Further, the configurations described above may be combined appropriately. Furthermore, within the scope not departing from the gist of the present disclosure, various omission, replacement, and modifications of the components may be made.

The on-vehicle recording control apparatus and the recording control method according to the present application may be used for, for example, a drive recorder.

According to the present application, it is possible to appropriately record an event.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An on-vehicle recording control apparatus comprising:
a captured data acquisition unit configured to acquire video data captured by a camera that captures an image of surroundings of a vehicle;
an event detection unit configured to detect an event based on acceleration applied to the vehicle;
an operation controller configured to receive event recording operation based on user operation; and
a recording controller configured to:
record the video data acquired by the captured data acquisition unit;
generate, from the video data, event data of a longer retroactive period when the operation controller receives the event recording operation and acceleration that is equal to or larger than a predetermined value and that is not determined as an event by the event detection unit is detected before receiving the event recording operation, as compared to a case in which the acceleration that is equal to or larger than the predetermined value and that is not determined as an event by the event detection unit is not detected before receiving the event recording operation; and
store the generated event data.

2. The on-vehicle recording control apparatus according to claim 1, wherein
the recording controller is further configured to generate, from the video data, event data for a second retroactive period from an event recording operation reception time point when the acceleration that is equal to or larger than the predetermined value and that is not determined as an event by the event detection unit is detected before receiving the event recording operation, that is longer than a first retroactive period from the event recording operation reception time point when the acceleration that is equal to or larger than the predetermined value and that is not determined as an event by the event detection unit is not detected before receiving the event recording operation, and store the event data.

3. The on-vehicle recording control apparatus according to claim 2, wherein
when the acceleration that is equal to or larger than the predetermined value and that is not determined as an event by the event detection unit is not detected before receiving the event recording operation, the recording controller is further configured to generate event data, from the video data, for a predetermined period before and after a second start point while adopting a time point at which the event recording operation is received as the second start point to store the generated event data, and
when the acceleration that is equal to or larger than the predetermined value and that is not determined as an event by the event detection unit is detected before receiving the event recording operation, the recording controller is further configured to generate event data, from the video data, for a predetermined period before and after a third start point while adopting a time point at which the acceleration that is equal to or larger than the predetermined value and that is not determined as an event by the event detection unit is detected as the third start point to store the generated event data.

4. The on-vehicle recording control apparatus according to claim 1, wherein
when the event detection unit detects an event, the recording controller is further configured to generate, from the video data, event data of a first retroactive period from an event detection time point to store the generated event data.

5. A recording control method implemented by an on-vehicle recording control apparatus comprising:
acquiring video data captured by a camera that captures an image of surroundings of a vehicle;
detecting an event based on acceleration applied to the vehicle;
receiving event recording operation based on user operation;
recording the video data acquired at the acquiring;
generating, from the video data, event data of a longer retroactive period when the event recording operation is received at the receiving and acceleration that is equal to or larger than a predetermined value and that is not determined as an event is detected at the detecting before receiving the event recording operation, as compared to a case in which the acceleration that is equal to or larger than the predetermined value and that is not determined as an event at the detecting is not detected before receiving the event recording operation; and
storing the generated event data.

* * * * *